US011615714B2

(12) United States Patent
Gan et al.

(10) Patent No.: US 11,615,714 B2
(45) Date of Patent: Mar. 28, 2023

(54) ADAPTIVE LEARNING IN SMART PRODUCTS BASED ON CONTEXT AND LEARNER PREFERENCE MODES

(71) Applicant: Kyndryl, Inc., New York, NY (US)

(72) Inventors: Seng Chai Gan, Ashburn, VA (US);
Shikhar Kwatra, Durham, NC (US);
Vijay Ekambaram, Chennai (IN);
Saravanan Sadacharam, Chennai (IN)

(73) Assignee: Kyndryl, Inc., New York, NY (US)

( * ) Notice: Subject to any disclaimer, the term of this patent is extended or adjusted under 35 U.S.C. 154(b) by 400 days.

(21) Appl. No.: 16/862,805

(22) Filed: Apr. 30, 2020

(65) Prior Publication Data

US 2021/0343179 A1    Nov. 4, 2021

(51) Int. Cl.
| | | |
|---|---|---|
| *G09B 19/00* | (2006.01) | |
| *G09B 5/06* | (2006.01) | |
| *G09B 5/04* | (2006.01) | |
| *G06N 3/04* | (2023.01) | |
| *G06N 3/08* | (2023.01) | |

(52) U.S. Cl.
CPC ............ *G09B 19/00* (2013.01); *G06N 3/04* (2013.01); *G06N 3/08* (2013.01); *G09B 5/04* (2013.01); *G09B 5/065* (2013.01)

(58) Field of Classification Search
CPC ........... G09B 19/00; G09B 5/04; G09B 5/06; G06N 3/04; G06N 3/08
See application file for complete search history.

(56) References Cited

U.S. PATENT DOCUMENTS

| | | | |
|---|---|---|---|
| 6,206,700 B1 | 3/2001 | Brown | |
| 2005/0196730 A1 | 9/2005 | Kellman | |
| 2006/0223043 A1* | 10/2006 | Dancy-Edwards | ...... G09B 7/00 |
| | | | 434/362 |
| 2010/0190143 A1 | 7/2010 | Gal | |

(Continued)

FOREIGN PATENT DOCUMENTS

| | | |
|---|---|---|
| CN | 203480706 U | 3/2014 |
| CN | 205730374 U | 11/2016 |

(Continued)

OTHER PUBLICATIONS

Graf et al., "Providing Adaptive Courses in Learning Management Systems with Respect to Learning Styles," E-Learn: World Conference on E-Learning in Corporate, Government, Healthcare, and Higher Education, Association for the Advancement of Computing in Education (AACE), 2007, 8 pages.

Kumar, "Implementation of Artificial Intelligence in Imparting Education and Evaluating Student Performance," Journal of Artificial Intelligence and Capsule Networks (2019), vol. 01/ No. 01, Sep. 2019, pp. 1-9.

(Continued)

*Primary Examiner* — Eddy Saint-Vil
(74) *Attorney, Agent, or Firm* — VanLeeuwen & VanLeeuwen; Erik Swanson (57) ABSTRACT

An approach is provided in which the approach converts a set of learning content into a teaching content vector representation. The approach determines a learning preference mode of a user based on a set of user responses responding to a set of learning type segments, and computes an environmental context vector representation of a physical environment surrounding the user. The approach conducts a conversation with the user based on the learning preference mode, the environmental context vector representation, and the teaching content vector representation.

17 Claims, 9 Drawing Sheets

(56) References Cited

U.S. PATENT DOCUMENTS

| | | | | |
|---|---|---|---|---|
| 2014/0118338 A1* | 5/2014 | Champion | ............... | G09B 7/00 |
| | | | | 345/419 |
| 2014/0122384 A1* | 5/2014 | Champion | ............... | G09B 7/02 |
| | | | | 706/12 |
| 2014/0122404 A1* | 5/2014 | Champion | ............... | G09B 7/00 |
| | | | | 706/46 |
| 2014/0272912 A1* | 9/2014 | Rozycki | ................... | G09B 5/08 |
| | | | | 434/362 |
| 2016/0101370 A1 | 4/2016 | Madsen | | |
| 2017/0136380 A1 | 5/2017 | Creedican | | |
| 2017/0337838 A1* | 11/2017 | Elkon | ...................... | G09B 7/04 |
| 2018/0349560 A1* | 12/2018 | McCloskey | .......... | A61B 5/0022 |
| 2020/0233925 A1* | 7/2020 | Reyes Ramirez | ..... | G09B 19/00 |
| 2021/0150927 A1* | 5/2021 | Monos | .................... | G09B 5/00 |

FOREIGN PATENT DOCUMENTS

| | | |
|---|---|---|
| CN | 206549169 U | 10/2017 |
| WO | 2019063951 W | 4/2019 |

OTHER PUBLICATIONS

Williams et al., "PopBots: Designing an Artificial Intelligence Curriculum for Early Childhood Education," Association for the Advancement of Artificial Intelligence (www.aaai.org), 2019, 8 pages.

Roybi Robot, "How Robots are Revolutionizing Preschool Education," Roybi, Dec. 11, 2018, 6 pages.

"IBM Watson and Sesame Workshop Introduce Intelligent Play and Learning Platform on IBM Cloud," IBM Corporation, Jun. 6, 2017, 3 pages.

* cited by examiner

ADAPTIVE LEARNING IN SMART PRODUCTS BASED ON CONTEXT AND LEARNER PREFERENCE MODES

BACKGROUND

Different users prefer different learning styles and techniques. Seven traditional learning styles are i) visual (spatial) learning; ii) aural (auditory-musical) learning; iii) verbal (linguistic) learning; iv) physical (kinesthetic) learning; v) logical (mathematical) learning; vi) social (interpersonal) learning; and vii) solitary (intrapersonal) learning. Some users have a dominant style of learning and far less use of the other styles. Other users may find that they use different learning styles in different circumstances.

Along these lines, instructors have the ability to teach adolescents in a variety of ways. For example, an instructor can teach a "fruit" in several ways such as by i) showing a real apple and discussing the apple; ii) verbally explaining an apple; iii) explaining an apple when an apple image is in a movie; iv) explaining an apple via gestures and jokes; or v) explaining an apple in a song. An instructor may be limited in certain teaching techniques based on available resources. For example, an instructor needs a real apple to show the apple, a video device to watch a movie, or a musical device to listen to a song about an apple.

BRIEF SUMMARY

According to one embodiment of the present disclosure, an approach is provided in which the approach converts a set of learning content into a teaching content vector representation. The approach determines a learning preference mode of a user based on a set of user responses responding to a set of learning type segments, and computes an environmental context vector representation of a physical environment surrounding the user. The approach conducts a conversation with the user based on the learning preference mode, the environmental context vector representation, and the teaching content vector representation.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE SEVERAL VIEWS OF THE DRAWINGS

The present disclosure may be better understood, and its numerous objects, features, and advantages made apparent to those skilled in the art by referencing the accompanying drawings, wherein.

DETAILED DESCRIPTION

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. The following detailed description will generally follow the summary of the disclosure, as set forth above, further explaining and expanding the definitions of the various aspects and embodiments of the disclosure as necessary.

Figure 1:
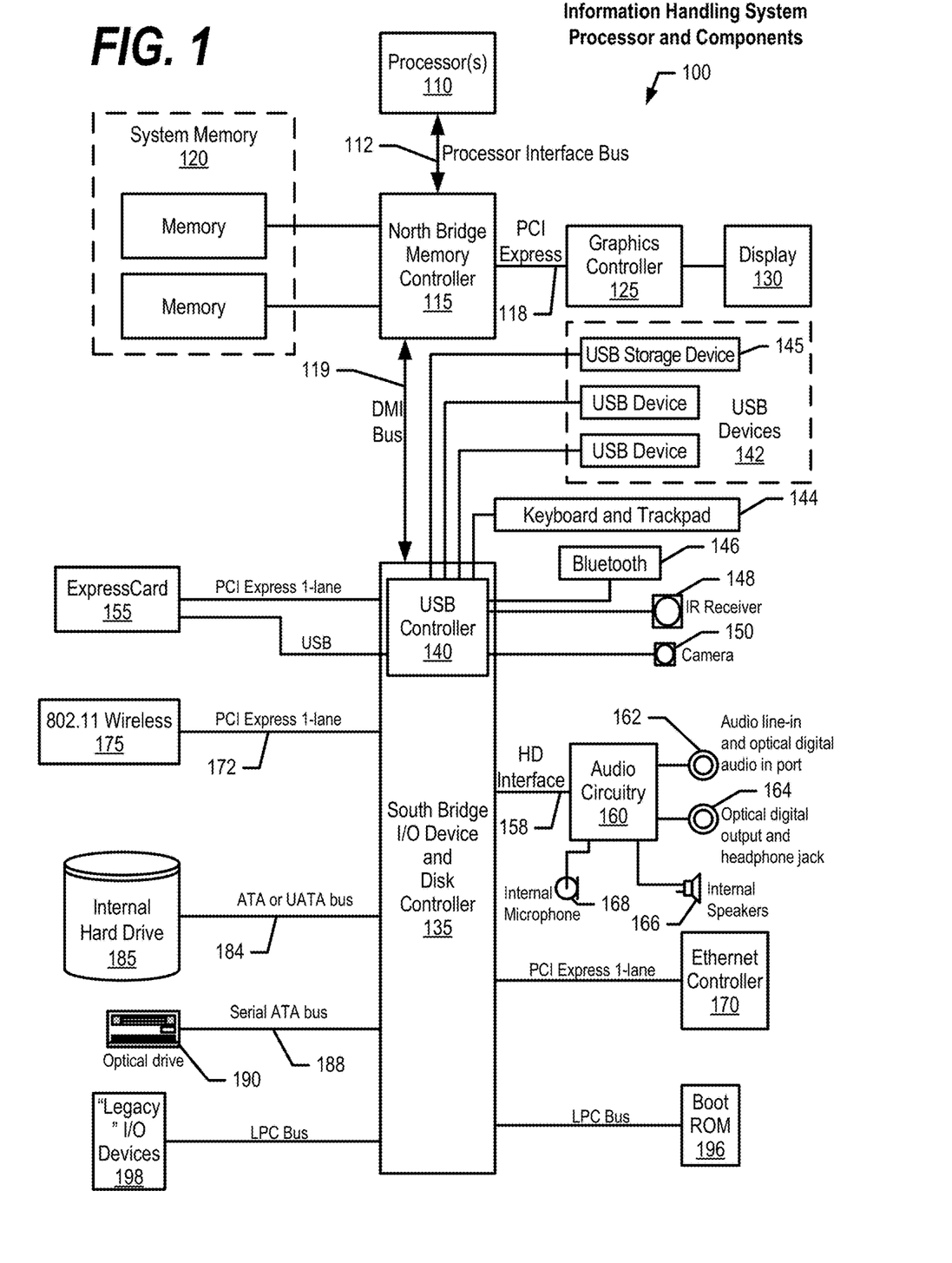
FIG. 1 is a block diagram of a data processing system in which the methods described herein can be implemented.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, Peripheral Component Interconnect (PCI) Express bus 118 connects Northbridge 115 to graphics controller 125. Graphics controller 125 connects to display device 130, such as a computer monitor.

Northbridge 115 and Southbridge 135 connect to each other using bus 119. In some embodiments, the bus is a Direct Media Interface (DMI) bus that transfers data at high speeds in each direction between Northbridge 115 and Southbridge 135. In some embodiments, a PCI bus connects the Northbridge and the Southbridge. Southbridge 135, also known as the Input/Output (I/O) Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and Universal Serial Bus (USB) connectivity as it connects to Southbridge 135 using both the USB and the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, Integrated Services Digital Network (ISDN) connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the Institute of Electrical and Electronic Engineers (IEEE) 802.11 standards of over-the-air modulation techniques that all use the same protocol to wireless communicate between information handling system 100 and another computer system or device. Optical storage device 190 connects to Southbridge 135 using Serial Analog Telephone Adapter (ATA) (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality associated with audio hardware such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, Automated Teller Machine (ATM), a portable telephone device, a communication device or other devices that include a processor and memory.

Figure 2:
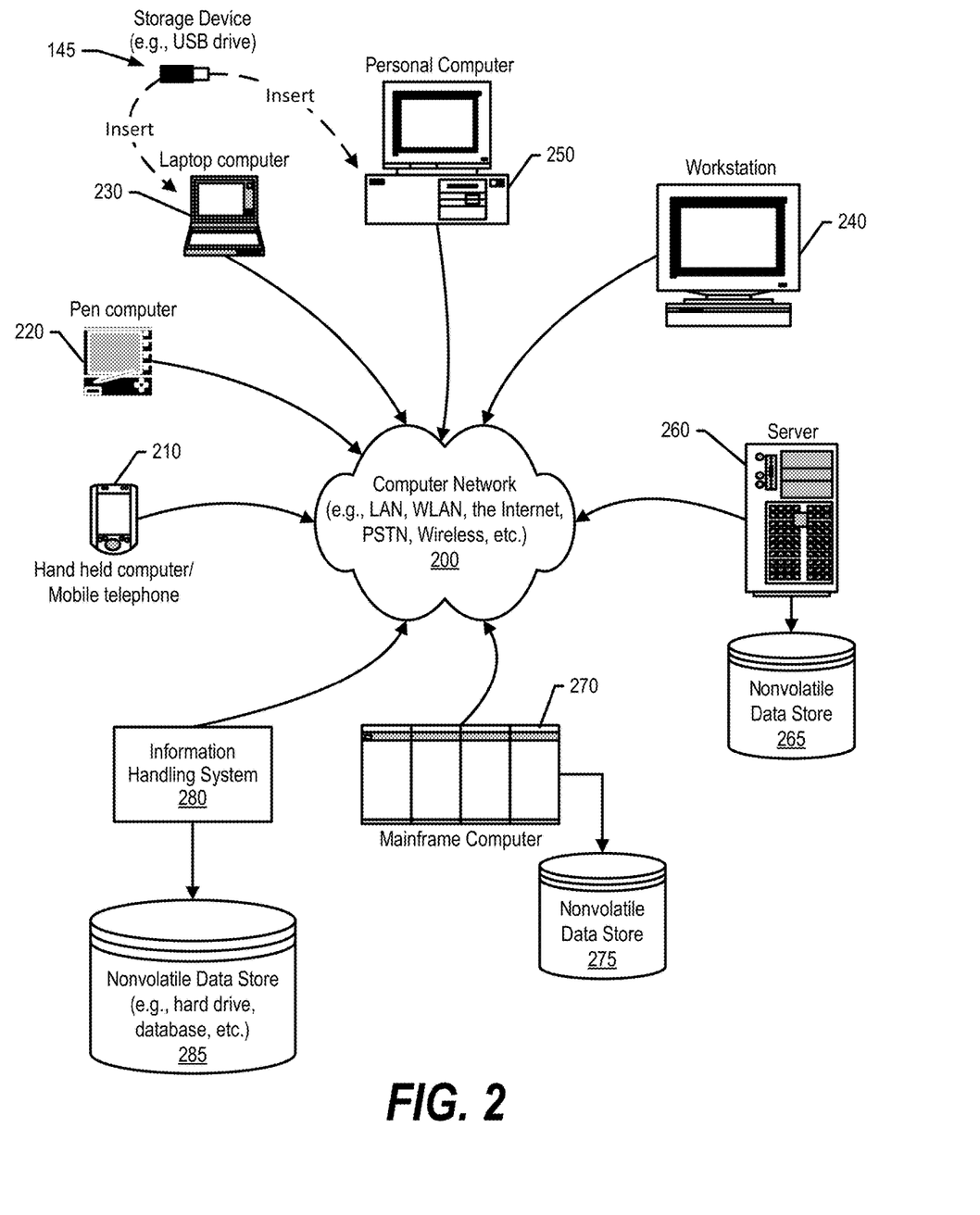
FIG. 2 provides an extension of the information handling system environment shown in FIG. 1 to illustrate that the methods described herein can be performed on a wide variety of information handling systems which operate in a networked environment.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as Moving Picture Experts Group Layer-3 Audio (MP3) players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. The embodiment of the information handling system shown in FIG. 2 includes separate nonvolatile data stores (more specifically, server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

As discussed above, instructors have the ability to educate adolescents in a variety of ways. Today's smart toys educate adolescents in a rudimentary manner and have hard-coded logics and content that changes based on user personalization, etc. A challenge found, however, is that today's smart toys, incorporated herein as smart products, do not evaluate a user's heuristics pertaining to certain contextual situations and do not take into account the user's surrounding environment to optimally interact with the user.

FIGS. 3 through 9 depict an approach that can be executed on an information handling system that renders smart product conversations (via audio and body movements) to explain a learning content (e.g., As a song, as a song with gestures, show and tell, etc.) that appeals most to a user while optimally leveraging the user's current environmental conditions through ingestion of multi-modal inputs from the contextual environment. In one embodiment, the approach uses deep neural encoding-decoding that learns by capturing data from teacher-student learning sessions and improves over time based on run-time feedback.

Figure 3:
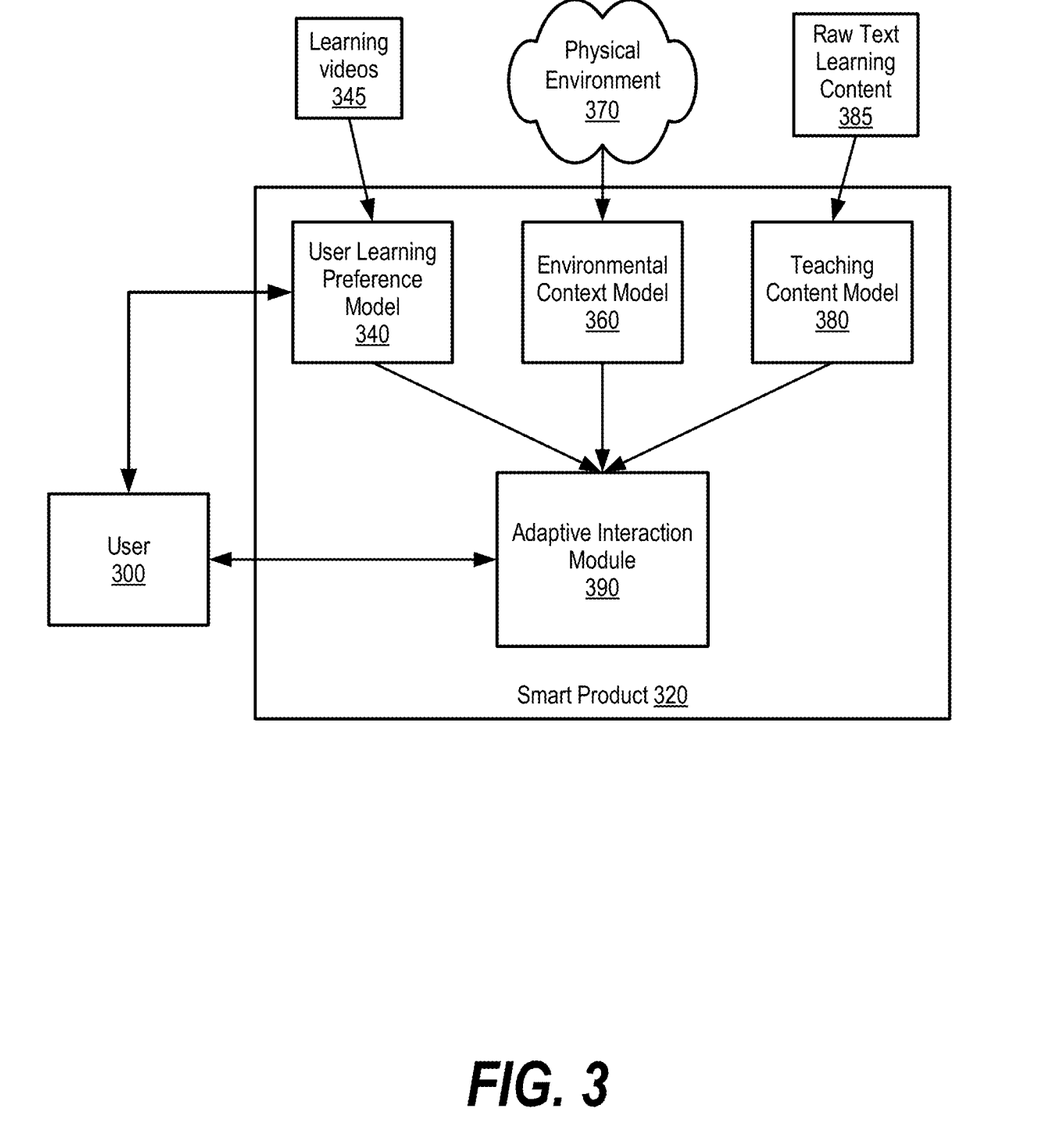
FIG. 3 is an exemplary diagram depicting a smart product interacting with a user based on determined user learning preferences, environmental contexts, and teaching content.

FIG. 3 is an exemplary diagram depicting a smart product interacting with a user based on determined user learning preferences, environmental contexts, and teaching content. As defined herein, smart product 320 uses deep neural encode-decode approaches that learns by capturing data during user 300 interaction sessions and improves over time based on run-time feedback rewards, environmental context, and user learning preference mode adjustments.

User learning preference model 340 receives learning videos 345 (video content) and segments/annotates learning videos 345 according to learning preferences (visual, auditory, etc.). User learning preference model 340 then uses a reinforcement learning approach to display the video segments to user 300 and capture user 300's responses while user 300 watches the different segmented/annotated videos. User learning preference model 340 assigns rewards based on user 300's reactions where positive rewards are given to positive reactions and negative rewards for negative reactions. Based on the rewards, user learning preference model 340 determines user 300's preferred mode of learning that feeds into adaptive interaction module 390 (see FIG. 5 and corresponding text for further details).

Environmental context model 360 analyzes user 300's physical environment 370 (e.g., a classroom) to understand user 300's surrounding environmental context (e.g., books, fruit, furniture, etc.). Environmental context model 360 uses an auto-encoder based approach to learn compact representations. The auto-encoder has an encoder that converts raw data to a hidden state and a decoder that converts the hidden state to raw data. Environmental context model 360 uses the intermediate hidden state as a compact representation output that feeds into adaptive interaction module 390 (see FIG. 6 and corresponding text for further details).

Teaching content model 380 uses raw text learning content 385 to learn compact representations of teaching content. Teaching content model 380 uses an auto-encoder similar to environmental context model 360 discussed above. The auto-encoder has an encoder that converts raw data to a hidden state and a decoder that converts the hidden state to raw data. Teaching content model 380, in turn, represents raw text learning content 385 as a neural embedding vector that feeds into adaptive interaction module 390 (see FIG. 6 and corresponding text for further details).

Adaptive interaction module 390 interacts with user 300 based on data received from user learning preference model 340, environmental context model 360, and teaching content model 380 as discussed herein. Adaptive interaction module 390 continuously adapts a learning style based on ongoing interactions with user 300 (see FIG. 8 and corresponding text for further details). In one embodiment, smart product 320 administers tests to user 300 to determine the effectiveness of different learning styles (see FIG. 9 and corresponding text for further details).

Figure 4:
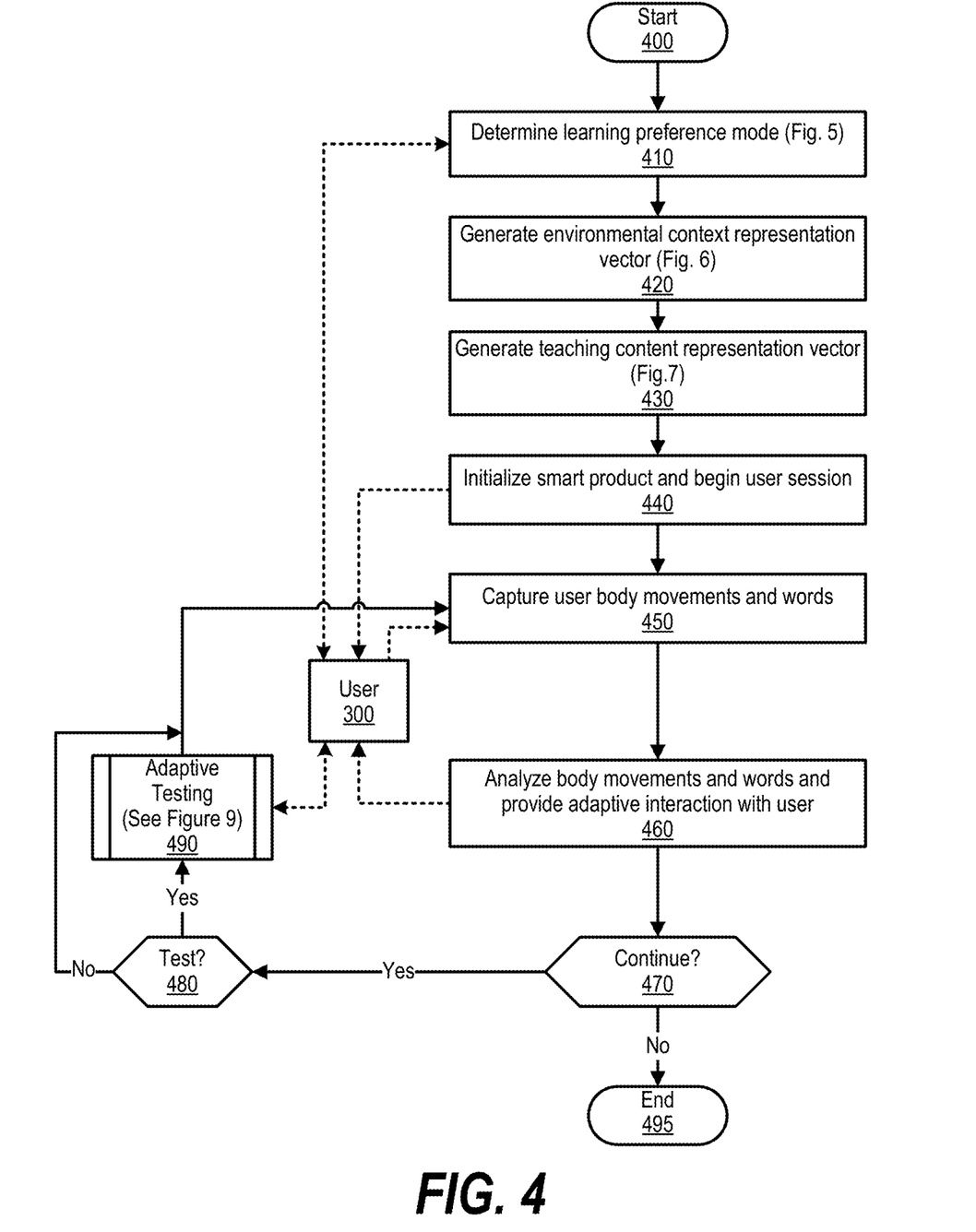
FIG. 4 is an exemplary high-level flowchart showing steps taken to train a smart product and utilize the smart product in a user session.

FIG. 4 is an exemplary high-level flowchart showing steps taken to train a smart product and utilize the smart product in a user session. FIG. 4 processing commences at 400 whereupon, at step 410, the process trains user learning preference model 340 to determine user 300's preferred mode of learning (see FIG. 5 and corresponding text for further details).

Figure 6:
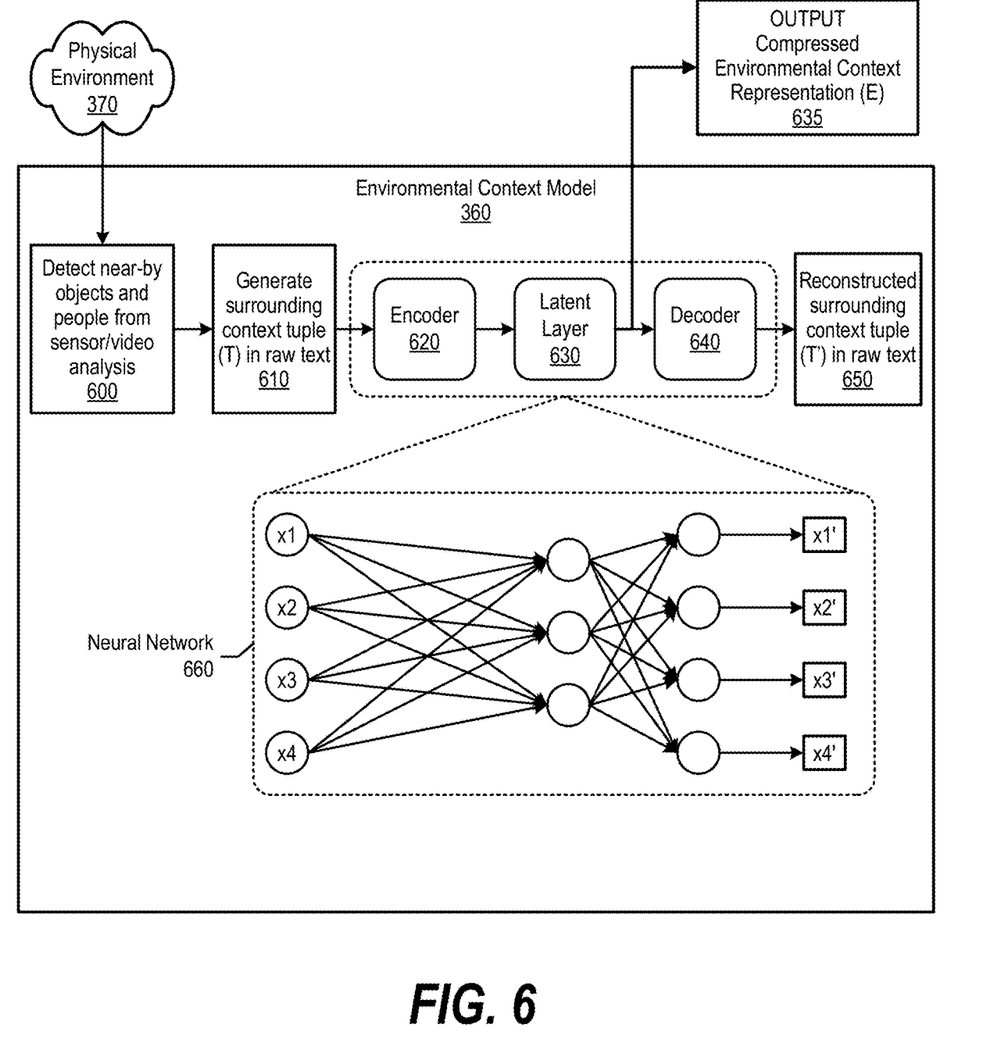
FIG. 6 is an exemplary diagram depicting an environmental context model generating a compressed environmental context vector representation of a physical environment.

At step 420, the process trains environmental context model to generate a compressed environmental context vector representation of physical environment 370 (see FIG. 6 and corresponding text for further details). At step 430, the process trains teaching content model 380 to generate a compressed vector learning content representation of raw text learning content 385 (see FIG. 7 and corresponding text for further details).

At step 440, the process initializes smart product 320 and begins a user session with user 300. For example, smart product 320 may perform a gesture (e.g., wave hand) and say "hello." At step 450, the process captures user 300 body movements and words and, at step 460, the process analyzes user 300's body movements and words and provides adaptive interactions with user 300 as discussed herein (see FIG. 8 and corresponding text for further details).

The process determines as to whether to continue (decision 470). If the process should continue, then decision 470 branches to the 'yes' branch whereupon the process determines as to whether to test user 300 and determine whether to adjust the preferred learning mode (decision 480). If the process should test user 300, then decision 480 branches to the 'yes' branch whereupon, at predefined process 490, the process administers an adaptive test to user 300 to fine-tune the user learning preference mode (see FIG. 9 and corresponding text for processing details). On the other hand, if the process should not test user 300, then decision 480 branches to the 'no' branch. The process then loops back to capture and evaluate more body movements and words from user 300. This looping continues until processing should terminate, at which point decision 470 branches to the 'no' branch whereupon FIG. 4 processing thereafter ends at 495.

Figure 5:
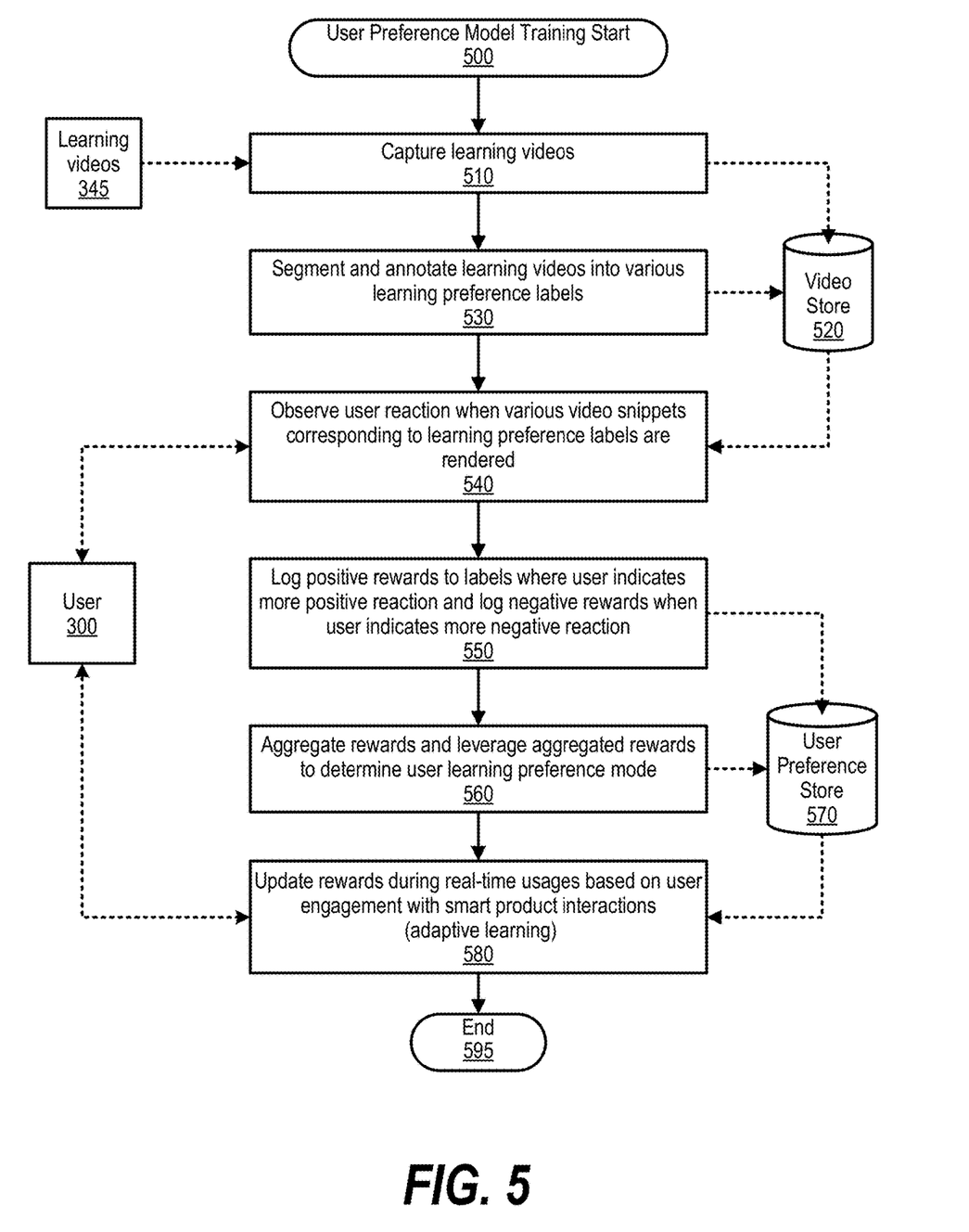
FIG. 5 is an exemplary flowchart showing steps taken to train a user learning preference model and determine a learning preference mode.

FIG. 5 is an exemplary flowchart showing steps taken to train a user learning preference model and determine a learning preference mode. FIG. 5 processing commences at 500 whereupon, at step 510, the process captures learning videos 345 and stores the learning videos in video store 520. At step 530, the process segments and annotates the learning videos into various learning preference labels, such as Visual, Aural, Verbal, Physical, Logical, Social, and Solitary.

At step 540, the process observes reactions from user 300 when various video snippets corresponding to the learning preference labels are rendered to user 300. At step 550, the process logs positive rewards to labels where user 300 indicates more positive reaction and negative rewards when user 300 indicates more negative reaction. For example, the process may log a value of "10" to a visual snippet where user 300 appears excited when watching.

Figure 7:
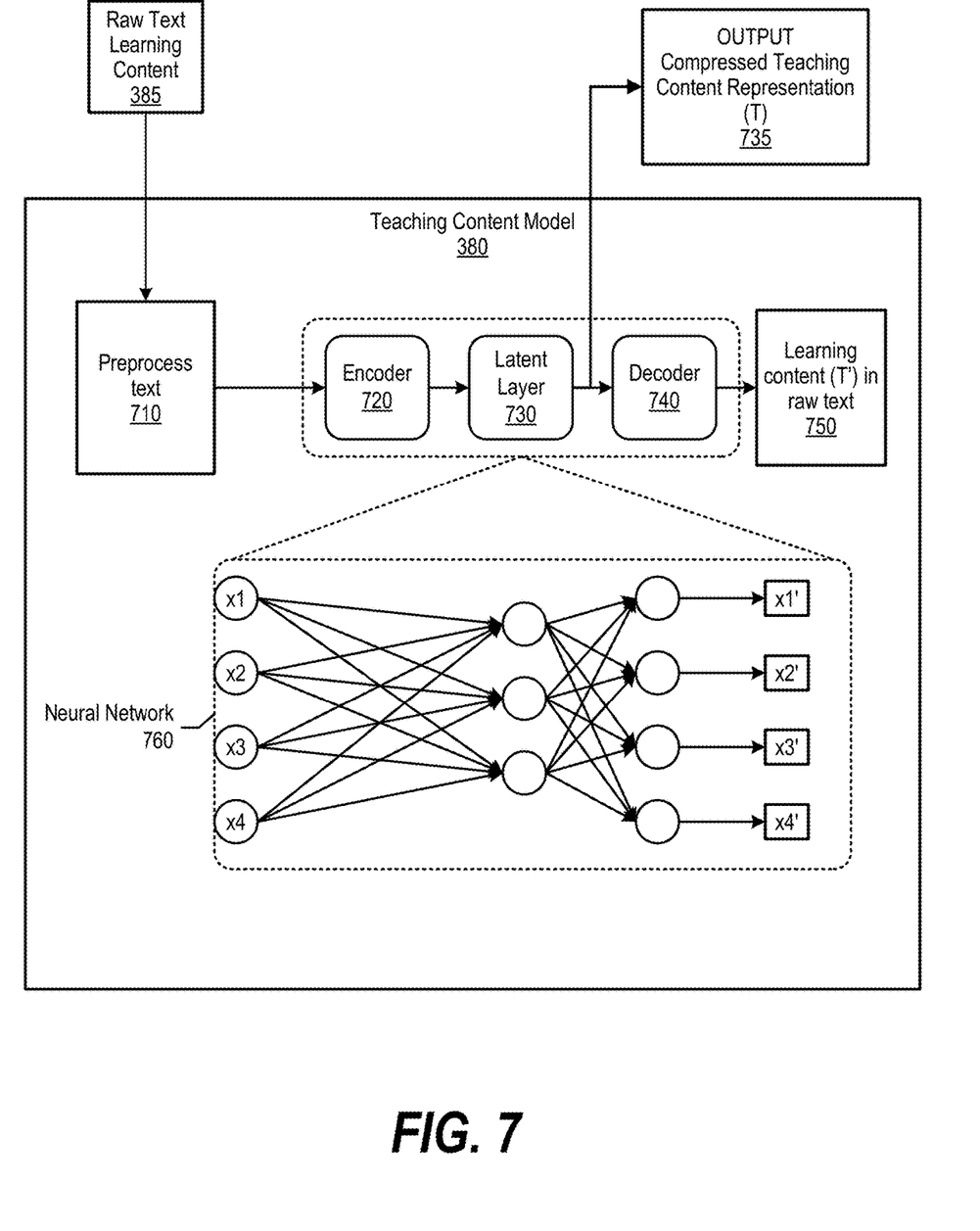
FIG. 7 is an exemplary diagram depicting a teaching content model generating a compressed vector learning content representation of raw text learning content.

At step 560, the process aggregates the rewards and leverages the aggregated rewards to determine and store user 300's learning preference mode in user preference store 570, such as "VISUAL." At step 580, the process updates the rewards during real-time usages based on user 300's interactions (See FIGS. 4, 7, and corresponding text for further details). FIG. 5 processing thereafter ends at 595.

FIG. 6 is an exemplary diagram depicting an environmental context model generating a compressed environmental context vector representation of physical environment 370. Environmental context model 360 evaluates physical environment 370 (e.g., video cameras, sensors, etc.) and detects near-by objects and people (600) in physical environment 370. Then, environmental context model 360 generates surrounding context tuples (T) in raw text (610), such as by applying image object recognition techniques and extracting objects from the environment in raw text.

Environmental context model 360 includes an auto-encoder (neural network 660) to create compact representations and generate a compact N dimensional vector that captures all the environmental information compactly and numerically. The auto-encoder includes encoder 620 that converts the raw data to a hidden state, which is a neural embedding representation. Encoder 620's last learning layer is latent layer 630, which is an output layer and represented as a separate latent layer in FIG. 6. Environmental context model 360 uses the hidden state to generate compressed environmental context vector representation (E) 635 that smart product 320 subsequently uses to provide adaptive responses to user 300 (see FIG. 8 and corresponding text for further details). Latent layer 630 feeds into decoder 640 that converts the hidden states to reconstructed raw text 650.

FIG. 7 is an exemplary diagram depicting a teaching content model generating a compressed vector learning content representation of raw text learning content 385. Teaching content model 380 performs preprocess text 710 on raw text learning content 385 to prepare the text for neural network 760 (auto-encoder), such as by using standard preprocessing method for text data.

The auto-encoder includes encoder 720 that converts the prepared text to a hidden state, which is a neural embedding representation. Encoder 720's last learning layer is latent layer 730, which is an output layer and represented as a separate latent layer in FIG. 7. Teaching content model 380 uses the hidden state to generate compressed teaching content vector representation (T) 735 that smart product 320 subsequently uses to provide adaptive responses to user 300 (see FIG. 8 and corresponding text for further details). Latent layer 730 feeds into decoder 740 that converts the hidden states to learning content raw text 750.

Figure 8:
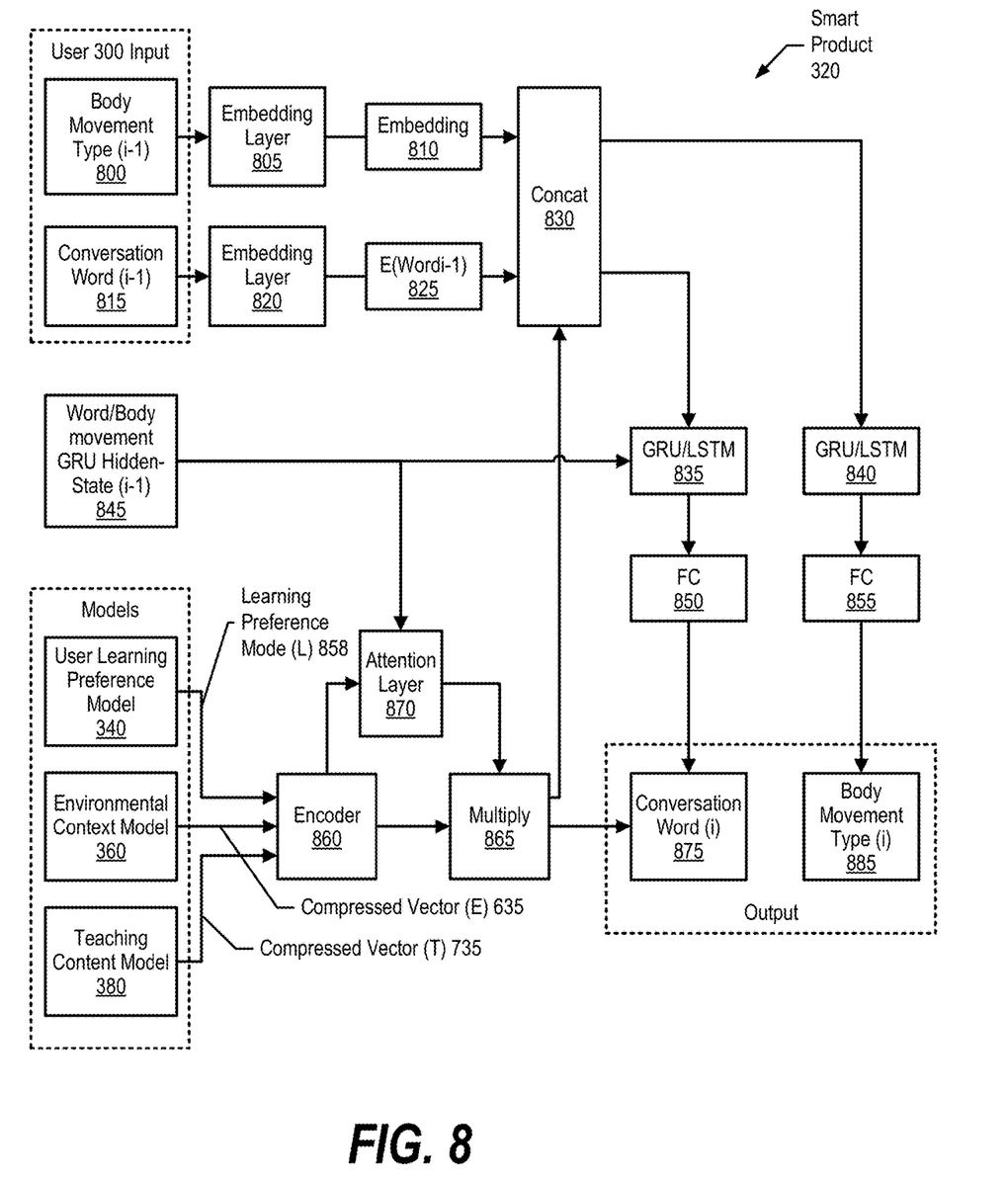
FIG. 8 is an exemplary diagram of a smart product that intelligently interacts with a user based on the user's preferred learning style and environment.

FIG. 8 is an exemplary diagram of a smart product that intelligently interacts with user 300 based on user 300's preferred learning style and environment. Smart product 320 adapts teaching content into interactions while optimally using surrounding context and user learning preference data to adaptively teach user 300.

Smart product 320 captures user 300 input, which includes body movement type 800 (e.g., arms moving, slouching, etc.) and conversation word 815. Embedding layers 805 and 820 extract an n dimensional vector from their respective inputs, which are embeddings 810 and 825 respectively. Concatenation block 830 concatenates both embeddings 810 and 825.

Smart product 320 includes two Recurrent Neural Network (RNN) pipelines that, in one embodiment, utilize a gated recurrent unit (GRU) component, a long short-term memory (LSTM) component, and a fully connected (FC) component. The first RNN pipeline, which includes GRU/LSTM 835 and FC 850, predicts a next conversation word 875 based on a past conversation word 815, word/body movement GRU hidden state 845, and the output of multiply 865 (discussed below).

The second RNN pipeline, which includes GRU/LSTM 840 and FC 855, predicts the next body movement type 885 based on past body movements 800. Smart product 320 then interacts with user 300 via verbally and movements based on conversation word 875 and body movement type 885. In one embodiment, smart product 320 continues to predict words and body movement sequences until it encounters an end delimiter (e.g., goodbye). Smart product 320 also uses a start delimiter to predict the first word and body movement.

User learning preference model 340 feeds learning preference mode (L) 858 into encoder 860 (see FIG. 5 and corresponding text for further details). Environmental context model 360 represents physical environment 370 as a compressed vector and feeds the compressed vector (E) 635 into encoder 860 (see FIG. 6 and corresponding text for further details). Likewise, teaching content model 380 represents raw text learning content 385 as a compressed vector and feeds the compressed vector (T) 735 into encoder 860.

Encoder 860 creates a compact representation that combines E, T and L, which feeds into attention layer 870 to learn which dimensions are important in encoder 860's output based on a last hidden state and adds and increased weighting accordingly. Multiply 865 multiplies encoder 860 output and attention layer 870 output to generate an embedding (e.g., N dimensional vector). The embedding merges features of User Learning Preference Model 340, Environmental Context Model 360, and Teaching Content Model 380 into a unified feature vector and is the output of 865.

Figure 9:
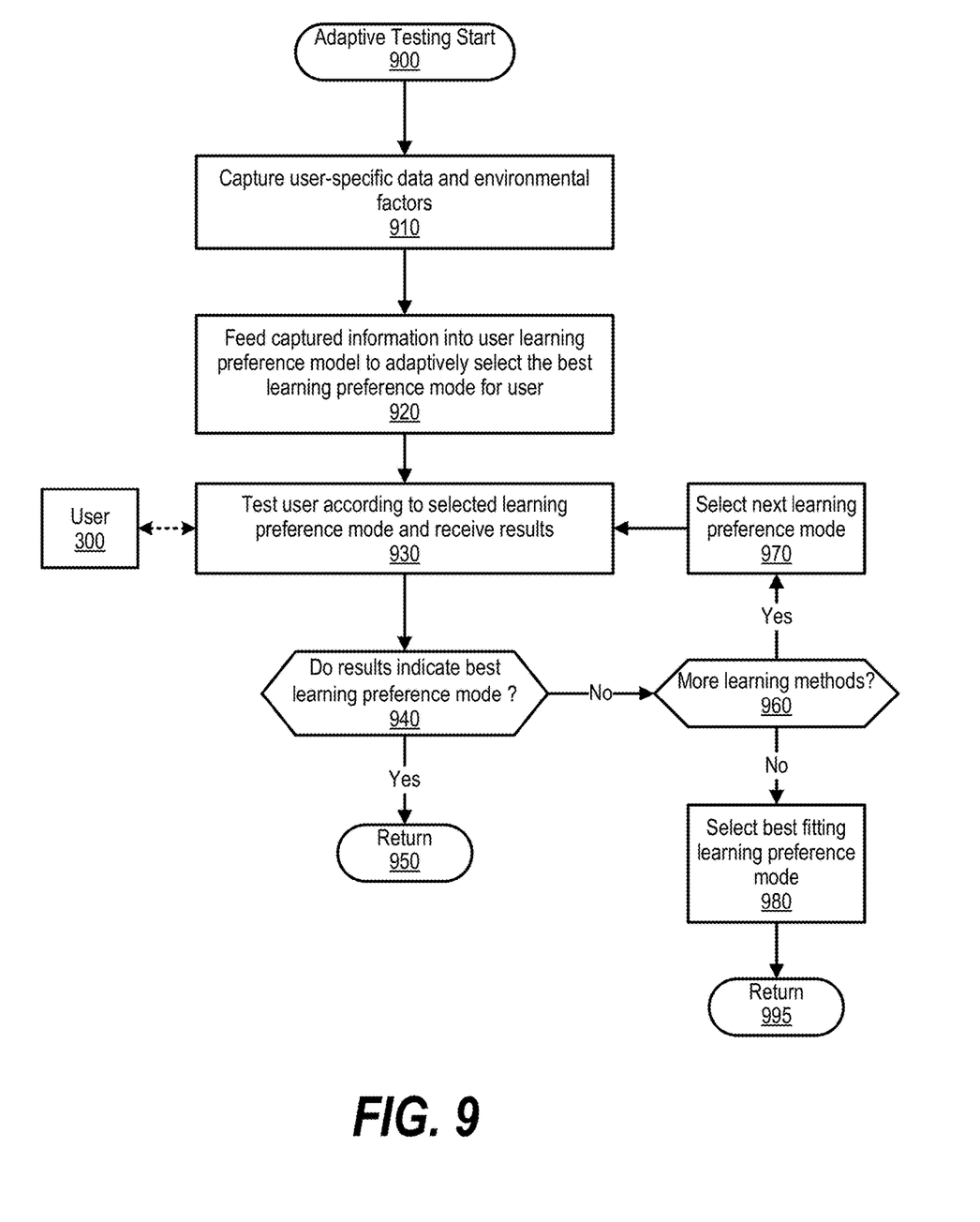
FIG. 9 is an exemplary flowchart showing steps taken to adaptively determine a best suited learning preference mode.

FIG. 9 is an exemplary flowchart showing steps taken to adaptively determine a best suited learning preference mode. FIG. 9 processing commences at 900 whereupon, at step 910, the process captures user-specific data and environmental factors. At step 920, the process feeds the captured information into user learning preference model 340 and adaptively selects the best learning preference mode for user 300 (see FIG. 4 and corresponding text for further details).

At step 930, the process tests user 300 according to the selected learning preference mode and receives results (e.g., provides a visual test or auditory test). The process determines whether the test results indicate a best learning preference mode (decision 940). If the test results indicate a best learning preference mode, then decision 940 branches to the 'yes' branch whereupon FIG. 9 processing thereafter returns to the calling routine (see FIG. 4) at 950.

On the other hand, if the test results do not indicate a best learning preference mode, then decision 940 branches to the "no" branch whereupon the process determines whether there are more learning modes available to test (e.g., auditory) (decision 960). If there are more learning modes available to test, decision 960 branches to the 'yes' branch whereupon the process selects next learning preference mode at step 970 and retests user 300 using the newly selected learning preference mode.

On the other hand, if there are no more learning modes available to test, then decision 960 branches to the 'no' branch and, at step 980, the process selects the best fitting learning preference mode (e.g., highest scoring learning preference mode). FIG. 9 processing thereafter returns to the calling routine (see FIG. 4) at 995.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

The invention claimed is:

1. A method implemented by an information handling system that includes a memory and a processor, the method comprising:
   converting a set of learning content into a teaching content vector representation;

determining, by a smart product, a learning preference mode of a user based on a set of user responses responding to a set of learning type segments;
generating, by the smart product, an environmental context vector representation of a physical environment surrounding the user, wherein the generating comprises:
  generating a set of context tuples in raw text, the generating based on a set of nearby objects;
  encoding the set of context tuples using a neural network, wherein the encoding converts the raw text to a hidden state; and
  generating, by a last learning layer, the environmental context vector representation from the hidden state; and
conducting, by the smart product, a conversation with the user based on the learning preference mode, the environmental context vector representation, and the teaching content vector representation.

2. The method of claim 1 wherein the conversation comprises speaking a set of words by the smart product and performing a set of movements by the smart product.

3. The method of claim 1 further comprising:
creating a set of preprocessed text from the set of learning content; and
encoding the set of preprocessed text using the neural network, wherein the last learning layer generates the teaching content vector representation.

4. The method of claim 1 further comprising:
parsing a set of video content into a set of video segments;
creating the learning type segments by annotating the set of video segments with a set of learner preference labels;
displaying the learning type segments to the user;
capturing a set of reactions of the user in response to the user viewing the learning type segments;
assigning a set of rewards to the user based on the set of reactions, wherein a positive reward is assigned to a positive reaction and negative reward is assigned to a negative reaction;
training a learning preference model based on an aggregation of the set of rewards and the set of learner preference labels; and
determining the learning preference mode by the trained learning preference model.

5. The method of claim 4 further comprising:
providing a set of user interactions to the user during the conversation;
capturing a set of user responses from the user responding to the user interactions;
updating the learning preference model based on the set of user responses;
determining an updated learning preference mode using the updated learning preference model; and
using the updated learning preference mode to provide a set of new user interactions to the user.

6. The method of claim 1 wherein the smart product is a smart toy, the method further comprising:
inputting the learning preference mode, the environmental context vector representation, and the teaching content vector representation into an encoder;
combining, by the encoder, the learning preference mode, the environmental context vector representation, and the teaching content representation into a combined representation;
inputting the combined representation and a set of historically used words by the smart toy into a first recurrent neural network (RNN) that predicts a next word by the smart toy based on the combined representation and the set of historically used words;
inputting the combined representation and a set of historical movements of the smart toy into a second RNN that predicts a next body movement of the smart toy based on the combined representation and the set of historical movements; and
instructing the smart toy to speak the predicted next word and perform the predicted next body movement.

7. An information handling system comprising:
one or more processors;
a memory coupled to at least one of the processors;
a set of computer program instructions stored in the memory and executed by at least one of the processors in order to perform actions of:
  converting a set of learning content into a teaching content vector representation;
  determining, by a smart product, a learning preference mode of a user based on a set of user responses responding to a set of learning type segments;
  generating, by the smart product, an environmental context vector representation of a physical environment surrounding the user, wherein the generating comprises:
    generating a set of context tuples in raw text, the generating based on a set of nearby objects;
    encoding the set of context tuples using a neural network, wherein the encoding converts the raw text to a hidden state; and
    generating, by a last learning layer, the environmental context vector representation from the hidden state; and
  conducting, by the smart product, a conversation with the user based on the learning preference mode, the environmental context vector representation, and the teaching content vector representation.

8. The information handling system of claim 7 wherein the conversation comprises speaking a set of words by the smart product and performing a set of movements by the smart product.

9. The information handling system of claim 7 wherein the processors perform additional actions comprising:
creating a set of preprocessed text from the set of learning content; and
encoding the set of preprocessed text using the neural network, wherein the last learning layer generates the teaching content vector representation.

10. The information handling system of claim 7 wherein the processors perform additional actions comprising:
parsing a set of video content into a set of video segments;
creating the learning type segments by annotating the set of video segments with a set of learner preference labels;
displaying the learning type segments to the user;
capturing a set of reactions of the user in response to the user viewing the learning type segments;
assigning a set of rewards to the user based on the set of reactions, wherein a positive reward is assigned to a positive reaction and negative reward is assigned to a negative reaction;
training a learning preference model based on an aggregation of the set of rewards and the set of learner preference labels; and
determining the learning preference mode by the trained learning preference model.

11. The information handling system of claim 10 wherein the processors perform additional actions comprising:
   providing a set of user interactions to the user during the conversation;
   capturing a set of user responses from the user responding to the user interactions;
   updating the learning preference model based on the set of user responses;
   determining an updated learning preference mode using the updated learning preference model; and
   using the updated learning preference mode to provide a set of new user interactions to the user.

12. The information handling system of claim 7 wherein the smart product is a smart toy, and wherein the processors perform additional actions comprising:
   inputting the learning preference mode, the environmental context vector representation, and the teaching content vector representation into an encoder;
   combining, by the encoder, the learning preference mode, the environmental context vector representation, and the teaching content representation into a combined representation;
   inputting the combined representation and a set of historically used words by the smart toy into a first recurrent neural network (RNN) that predicts a next word by the smart toy based on the combined representation and the set of historically used words;
   inputting the combined representation and a set of historical movements of the smart toy into a second RNN that predicts a next body movement of the smart toy based on the combined representation and the set of historical movements; and
   instructing the smart toy to speak the predicted next word and perform the predicted next body movement.

13. A computer program product stored in a computer readable storage medium, comprising computer program code that, when executed by an information handling system, causes the information handling system to perform actions comprising:
   converting a set of learning content into a teaching content vector representation;
   determining, by a smart product, a learning preference mode of a user based on a set of user responses responding to a set of learning type segments;
   generating, by the smart product, an environmental context vector representation of a physical environment surrounding the user, wherein the generating comprises:
      generating a set of context tuples in raw text, the generating based on a set of nearby objects;
      encoding the set of context tuples using a neural network, wherein the encoding converts the raw text to a hidden state; and
      generating, by a last learning layer, the environmental context vector representation from the hidden state; and
   conducting, by the smart product, a conversation with the user based on the learning preference mode, the environmental context vector representation, and the teaching content vector representation.

14. The computer program product of claim 13 wherein the conversation comprises speaking a set of words by the smart product and performing a set of movements by the smart product.

15. The computer program product of claim 13 wherein the information handling system performs further actions comprising:
   creating a set of preprocessed text from the set of learning content; and
   encoding the set of preprocessed text using the neural network, wherein the last learning layer generates the teaching content vector representation.

16. The computer program product of claim 13 wherein the information handling system performs further actions comprising:
   parsing a set of video content into a set of video segments;
   creating the learning type segments by annotating the set of video segments with a set of learner preference labels;
   displaying the learning type segments to the user;
   capturing a set of reactions of the user in response to the user viewing the learning type segments;
   assigning a set of rewards to the user based on the set of reactions, wherein a positive reward is assigned to a positive reaction and negative reward is assigned to a negative reaction;
   training a learning preference model based on an aggregation of the set of rewards and the set of learner preference labels; and
   determining the learning preference mode by the trained learning preference model.

17. The computer program product of claim 16 wherein the information handling system performs further actions comprising:
   providing a set of user interactions to the user during the conversation;
   capturing a set of user responses from the user responding to the user interactions;
   updating the learning preference model based on the set of user responses;
   determining an updated learning preference mode using the updated learning preference model; and
   using the updated learning preference mode to provide a set of new user.

* * * * *